Nov. 30, 1937.                K. R. HEINITZ                   2,100,804
      DRIVE FOR CALCULATING MACHINES, BOOKKEEPING MACHINES, AND THE LIKE
                     Filed Oct. 6, 1933           2 Sheets-Sheet 1

Inventor;
Karl R. Heinitz
By
Attorney

Nov. 30, 1937.　　　　K. R. HEINITZ　　　　2,100,804
DRIVE FOR CALCULATING MACHINES, BOOKKEEPING MACHINES, AND THE LIKE
Filed Oct. 6, 1933　　　　2 Sheets-Sheet 2

Inventor:
Karl R. Heinitz
By
Attorney.

Patented Nov. 30, 1937

2,100,804

UNITED STATES PATENT OFFICE 2,100,804

DRIVE FOR CALCULATING MACHINES, BOOKKEEPING MACHINES, AND THE LIKE

Karl Reinhold Heinitz, Dresden, Germany

Application October 6, 1933, Serial No. 692,544
In Germany October 24, 1932

6 Claims. (Cl. 235—60)

This invention relates to calculating machines of the kind comprising one or more totalizers, driven by a shaft or other driving member and set by means of differential mechanism controlled by keys or other setting devices.

The object of the invention is to provide improvements in the construction and operation of calculating machines of the kind referred to and in particular to provide an improved form of differential setting mechanism which will be positive and quick in action and at the same time simple in construction and not liable to be quickly affected by wear.

According to the invention a calculating machine is provided wherein a rocking member or preliminary setting lever arranged to be set by keys to an angular position corresponding to the numerical value to be transmitted to the totalizer forms a guide or slideway for a member arranged to be reciprocated by the driving member, the aforesaid sliding member being arranged to impart movement to the totalizer through mechanism arranged so that the numerical value of the movement imparted to the totalizer during one reciprocation of the sliding member depends upon the setting of the rocking member.

The invention also provides an improved tens transfer mechanism for use in combination with the improved form of differential mechanism. The improved tens transfer mechanism comprises a pin and slot or like adjustable connection between the sliding member and a member which imparts movement directly to the totalizer, such pin and slot or like adjustable connection being arranged to be actuated automatically by mechanism controlled by the totalizer in such a manner as to move the totalizer actuating element relatively to the sliding member through a distance corresponding to one unit when necessary for effecting a tens transfer.

The drawings illustrate an example of construction of the invention.

Figure 1:
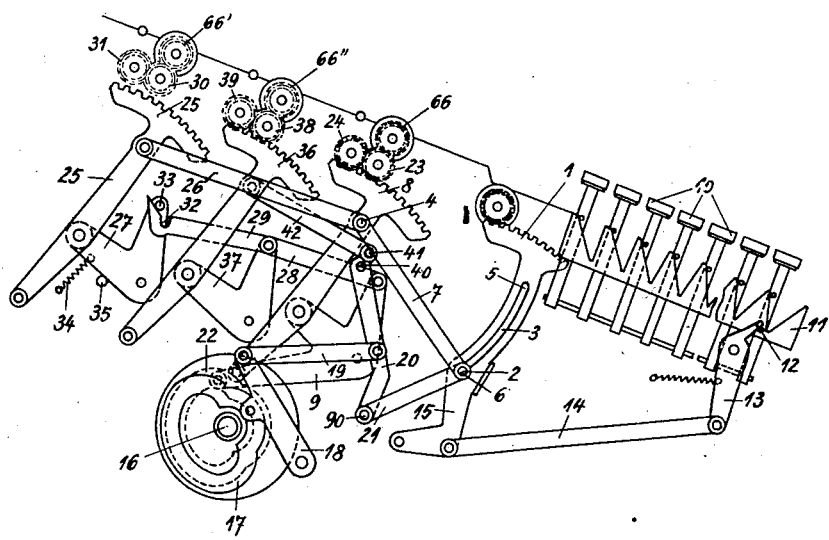
Figure 1 shows the parts provided for a simple calculating operation in the position of rest.
Figure 2:
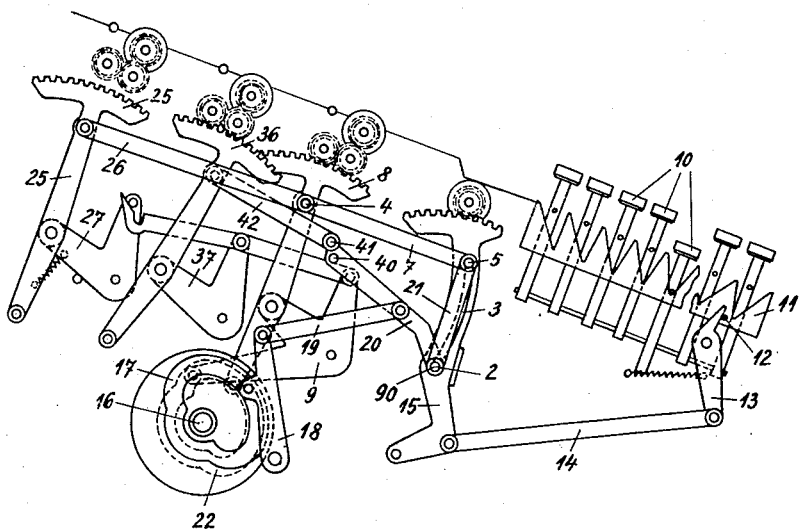
Fig. 2 shows the same parts during the carrying out of a calculating operation.
Figure 3:
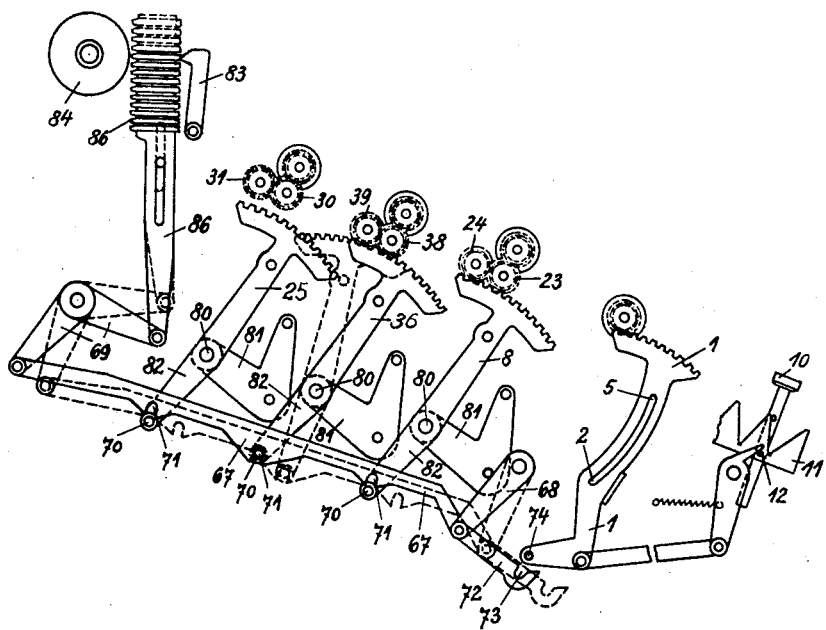

Fig. 3 explains the actuation of the recording device.

The differential setting mechanism comprises a toothed sector or preliminary setting lever 1 which is rotatably mounted on axis 2 on one wall of the calculating machine and is provided with a cam slot 3. The latter in the rest position of the toothed sector 1 forms an arc of which the center is a pin 4 secured to the toothed sector 8 of a differential actuator. To the pin 4 is hinged connecting rod 7 of which the other end carries a roller 6 engaging the slot 3, and which can be moved along the latter up to the other end 5 thereof. In the rest position of the rod 7 the roller 6 is coaxial to the bearing pin 2 of the lever 1.

The toothed sector 8 is mounted rotatably on a supporting lever 9 which in turn is supported by the machine frame, and it enables the toothed sector 8 to be raised or lowered to a slight extent so as to bring it into and out of engagement with toothed wheels 23 or 24 for selectively determining the direction of rotation of a numeral wheel 66 of a totalizing mechanism. Sector 8 is raised into mesh with wheels 23 or 24 of the totalizer during the proper time in the cycle of operation. Addition or subtraction is determined by slight lateral shift of totalizer wheels 23 and 24 with respect to said sectors.

When the preliminary setting lever 1 is in the rest position, the pin 4 and thus also the toothed sector 8 remain at rest when rocking the rod 7 about the pin 4. In this case, the roller 6 is moved idly along the slot 3 of the preliminary setting lever 1. If, however, the latter is moved to a greater or lesser angle from its rest position, the toothed sector 8 is also moved to a corresponding extent by the thrust rod when the roller 6 is moved upwardly along the slot 3 of the displaced lever.

The setting of the preliminary setting lever 1 is effected by depressing one of the keys 10, which during this movement shifts longitudinally a toothed slide 11 carrying a laterally projecting pin 12. This pin moves the upwardly extending arm of a double armed lever 13, of which the lower end is connected by a link 14 to the downwardly extending arm 15 of the preliminary setting lever 1. In order to enable the setting slide 11 to be moved through a distance corresponding with the corresponding digit when depressing one of the keys 10, the setting rod has its teeth flanks which bear against the actuating elements of the keys of inclination decreasing progressively from tooth to tooth in such a manner that, for example, the first key moves the setting rod 11 through a distance corresponding to the digit 1 and the fifth key moves the setting rod 11 a distance corresponding to the digit 5, and so on. In this manner it is possible to rock the preliminary setting lever 1 through nine different angles. It is important that both the setting of the preliminary setting lever 1, as also that of the toothed sector 8, is effected through positive connections not dependent on impact and not subject to overthrow, and that on the return movement of the thrust rod 7 into its starting position, the toothed sector 8 is actually returned under similar conditions so that jamming of the setting mechanism is excluded with certainty.

In order to enable the thrust rod 7 to be moved about the pin 4 through a definite angle independent of the digital value of an actuated key, the following actuating device is provided.

On the driving shaft 16 there is mounted a cam disc with a cam groove 17, with which engages a roller mounted on a lever 18. During each revolution of the shaft 16, the lever 18, pivoted on the machine frame, thus receives a reciprocating movement which is transmitted by means of a connecting rod 19 to a lever 20 mounted at 40 on the machine frame. To the free end of the lever 20 is pivotally connected a connecting rod 21 which is also connected to the thrust rod 7. The entire arrangement is such that on each complete revolution of the shaft 16, the roller 6 of the thrust rod 7 is moved from its rest position up to the other end 5 of the slot 3 and thus the pin 90 is set each time coaxially with the bearing pin 2 of the preliminary setting lever 1, so that in every operative position of the lever 1, the roller 6 will always reach the same position 5 of the slot 3.

In the path of the toothed sector 8 are located the two axially movable toothed wheels 23 and 24 mounted on the machine frame. In known manner these two wheels are selectively engageable with a numeral wheel 66 to turn it in one direction or the other according to whether additive or subtractive operation of the numeral wheel is desired, when the sector 8 performs an effective rocking movement.

In order to bring the sector 8 automatically into engagement with one of the toothed wheels 23 or 24, when carrying out a calculating operation, that is to say during one revolution of the shaft 16, the lever 9 carrying the toothed sector 8 engages by means of a roller, carried by a lateral arm of this lever, with a cam groove 22 of the cam disc secured to the shaft 16.

The method of operation when carrying out a simple calculating operation (unit setting) will be seen from the following:

After the key 10, corresponding with the calculating value, for example the "5" key, is depressed, and thus the setting slide 11 and the preliminary setting lever 1 have been moved through a corresponding distance, the shaft 16 is connected to its driving motor for a complete revolution. During this rotation the toothed sector 8 is first raised by means of the cam groove 22 and brought into engagement with one of the toothed wheels 23, 24. Then the roller 6 is moved upwardly in the slot 3 of the setting lever 1 by means of the groove 17 and the parts 18, 19, 20, 21, whereby the toothed sector 8 is rocked. In their further action the grooves cause the sector to be lowered and finally returned into the starting position. The setting angle of the sector 8 corresponds accurately with the previous setting of the lever 1 so that the numeral wheel 66 is turned through a number of steps corresponding to the key depressed.

In order to operate, corresponding to the extent of the rocking movements of the toothed sector 8, not only the numeral wheel 66 of a totalizer to be actuated but also a numeral wheel 66' of an item register, there is hinged to the pin 4 a connecting rod 26 of which the other end engages with a toothed sector 25. This sector, similarly to the toothed sector 8, is supported by a bell crank lever 27 in such a manner that it can be moved into and out of engagement with the axially movable toothed wheels 30 and 31, and the rocking movements of the toothed sector 25 in one direction are transmitted to the numeral wheel 66'. The lifting and lowering movement of the lever 27 is derived from the lever 9, which for this purpose has an upwardly extending arm with which engages the connecting rod 28, which transmits the movements of the lever 9 to an intermediate lever 37 and thence to the bell crank lever 27 by means of a further connecting rod 29. The connecting rod 29 actuates the bell crank lever 27 through a connection comprising an open slot 32 in the rod and a pin 33 on the lever, permitting the rod to become disconnected from the lever. When such disconnection occurs, an extended lip of the open slot bears against the pin 35 under the action of a spring 34. The entire arrangement is such that after connecting the lever 27 to the connecting rod 29 the toothed sector 25 partakes both in the lifting and lowering movements as also in the rocking movements of the toothed sector 8, always to the same extent.

In order to enable the number of calculating operations to be accurately determined, for control purposes, there is also provided an operation counter 66" with driving wheels 38 and 39 engageable by a toothed sector 36 mounted on the bell crank lever 37 so as to be capable of being raised and lowered. This toothed sector 36, however, according to the purpose of the operation counter 66" does not receive differential rocking movements from the toothed sector 8 but uniform movements from the lever 20 which always carries out equal strokes. For this purpose the lever 20 is provided with a pin 41 which is connected to the toothed sector 36 by means of a link 42.

Each of the above mentioned toothed sectors 8, 25, and 36 is further provided with a downwardly directed arm 82 (Fig. 3) at the lower end of which there is provided a pin 70. When one of the toothed sectors 8, 26, 36 is raised by the corresponding bell crank levers, its pin 70 engages with a slot 71 of a coupling rod 67. The latter is mounted at one of its ends on a guide lever 68 and at its other end on the bell crank lever 69. To the other end of the lever 69 is hinged a type carrier 68 so that this can be raised according to the rocking movements of the toothed sectors 8, 25, or 36. The type, corresponding to the set numerical value of the counting and calculating mechanism connected to the coupling rod 67, comes, in the known manner, in front of a striking hammer 83 so that that type can be struck against paper on a roller 84.

At that end of the coupling rod 67, turned towards the preliminary lever 1, there is further hinged a pawl 72 with a hook-like end 73 which can be engaged with a pin 74 on the preliminary setting lever 1. This pin 74 is the same distance from the fulcrum 2 of the preliminary setting lever 1 as are the pins 70 from the fulcrum 80 of the toothed sectors 8, 25, and 36. When the preliminary setting lever 1 is connected to the coupling rod 67 by the pawl 72, then the separate calculated values, which have been set by the keys 10, can be transmitted directly to the type carrier 86 and recorded. Conversely, it is also possible to retransfer the values set in the separate counting and calculating mechanisms 66, 66', or 66" by means of the coupling rod 67 and the pawl 72 to the preliminary setting lever 1 and key indicating mechanism 78 set by the latter so as to save setting by the keys the numerical values to be read off from the separate calculating mechanisms and to avoid the sources of error connected therewith.

I claim as my invention:—

1. In a calculating machine, a set of digit keys, a setting lever having guide means, connections between the keys and lever for imparting differential settings to the said lever and guide means, a differential actuator, a numeral wheel operated thereby, a connecting rod jointed at one end to the actuator and having its other end movable in the guide means of the setting lever to operate the actuator correspondingly to the setting of said means, and shaft operated drive means positively connected to the connecting rod to move its said other end in the guide means.

2. In a calculating machine, a set of digit keys, a setting lever pivotable about a fixed axis and having a guide therein intersecting said axis, connections between the keys and lever for imparting differential settings to the said lever and guide, a differential actuator, a numeral wheel operated thereby, a connecting rod jointed at one end to the actuator and having at its other end a joint reciprocable in the guide away from and back to coaxial relationship with the axis of the setting lever, and shaft operated drive means for reciprocating said joint, said drive means being positively connected to the connecting rod.

3. Calculating mechanism according to claim 2, in which the guide in the setting lever is of circular arcuate form and is so arranged that with zero setting of the lever the center of the arc coincides with the axis of the joint between the link and the actuator, and that settings of digit values produce corresponding displacements of the center of the arc guide from said axis.

4. A calculating machine according to claim 1 having a type bar and in which a coupling means is provided for connecting the type bar either to the differential actuator or the setting lever.

5. A calculating machine according to claim 1 having a type bar and in which a coupling means is provided connected to the type bar and adapted to be engaged with the differential actuator coincidently with engagement of said differential actuator with the numeral wheel.

6. A calculating machine according to claim 1 having a type bar and a plurality of differential actuators respectively operating numeral wheels of different accumulators and connected with each other by coupling rods whereby the actuator jointed to the connecting rod transmits a movement corresponding to its own movement to each other actuator, and in which coupling means are provided connected to the type bar and capable of engagement with either the actuators or the setting lever for movement of said type bar therewith.

KARL REINHOLD HEINITZ.